United States Patent
Li et al.

(10) Patent No.: US 12,480,300 B1
(45) Date of Patent: Nov. 25, 2025

(54) EASY-TO-CLEAN SEWER PIPE CONNECTING PIPE ASSEMBLY

(71) Applicant: Pan'an Dingsheng Plastic Co., Ltd., Zhejiang (CN)

(72) Inventors: Haichao Li, Zhejiang (CN); Zhengxing Li, Zhejiang (CN)

( * ) Notice: Subject to any disclaimer, the term of this patent is extended or adjusted under 35 U.S.C. 154(b) by 0 days.

(21) Appl. No.: 18/936,085

(22) Filed: Nov. 4, 2024

(30) Foreign Application Priority Data

Oct. 16, 2024  (CN) .......................... 202422498603.0

(51) Int. Cl.
*E03F 3/04* (2006.01)
*F16L 11/11* (2006.01)

(52) U.S. Cl.
CPC ................ *E03F 3/04* (2013.01); *F16L 11/11* (2013.01)

(58) Field of Classification Search
CPC .. F16L 11/11; F16L 15/02; F16L 27/12; E03F 3/04; E04D 13/08
See application file for complete search history.

(56) References Cited

U.S. PATENT DOCUMENTS

| | | | |
|---|---|---|---|
| 8,475,654 B1* | 7/2013 | Smith | E04D 13/08 |
| 11,761,564 B2* | 9/2023 | Grayson | F16L 11/15 |
| 11,885,441 B1* | 1/2024 | Zhang | F16L 11/11 |
| 2015/0136267 A1* | 5/2015 | Yu | E03C 1/284 |
| 2019/0263225 A1* | 8/2019 | Grégoire | F16L 11/11 |
| 2022/0347422 A1* | 11/2022 | Liao | F16L 11/11 |

* cited by examiner

*Primary Examiner* — Zachary T Dragicevich

(57) ABSTRACT

A sewer pipe connecting pipe assembly, comprising a telescopic pipe, wherein one end of the telescopic pipe is connected to a bottom connecting shell; another end of the telescopic pipe is connected to a transparent pipe, and an outer end of the transparent pipe is detachably connected to a top connecting shell; an outer wall of the transparent pipe is integrally formed with a first external thread, and a tail end of the transparent pipe is spirally connected to the telescopic pipe via the first external thread; an inner cavity of the transparent pipe is installed with a grid plate. The tail end of the transparent pipe can be screwed with the telescopic pipe by a first external thread, so that the transparent pipe, the top connecting shell and the telescopic pipe can be disassembled.

5 Claims, 4 Drawing Sheets

EASY-TO-CLEAN SEWER PIPE CONNECTING PIPE ASSEMBLY

TECHNICAL FIELD

The invention relates to the technical field of sewer pipe connectors, in particular to an easy-to-clean sewer pipe connecting pipe assembly.

BACKGROUND ART

Sewer pipes, also known as drainage pipes, are mainly used to transport used water (such as wastewater and sewage) back to their original place or designated treatment facilities. This water may come from domestic water areas such as toilets, kitchens, and bathrooms, or from wastewater discharge during industrial production processes. Sewer pipes use effective drainage design to ensure that wastewater can be discharged smoothly and quickly to avoid stagnation inside buildings, thereby maintaining a clean and hygienic environment.

Sewer pipe connectors are an integral part of the sewer system, which are used to connect and change the direction of sewer pipes, ensuring smooth water flow and preventing leaks.

At present, sewer pipes are installed on the outer walls of houses. Sewer pipes and water collecting pipes need to be connected with pipe connection components. Most of the existing pipe connection components are integrated pipe bodies. The pipes are easy to age. When replacing, the joints and pipes need to be replaced with new ones as a set. There is no function of blocking debris. The pipes and joints are integrated. Debris easily clogs the pipes, which is not conducive to drainage. It is not conducive to checking the location of the blockage, and the drainage is easy to overflow.

SUMMARY OF THE INVENTION

The purpose of the invention is to provide an easy-to-clean sewer pipe connecting pipe assembly to solve the problems raised in the background technology.

In order to achieve the above purpose, the invention provides the following technical solution: an easy-to-clean sewer pipe connecting pipe assembly, comprising a telescopic pipe, wherein one end of the telescopic pipe is connected to a bottom connecting shell;

another end of the telescopic pipe is connected to a transparent pipe, and an outer end of the transparent pipe is detachably connected to a top connecting shell; an outer wall of the transparent pipe is integrally formed with a first external thread, and a tail end of the transparent pipe is spirally connected to the telescopic pipe via the first external thread; an inner cavity of the transparent pipe is installed with a grid plate.

By adopting the above technical solution, the top connecting shell is first connected to the water collecting component on the top of the house, and then the bottom connecting shell is connected to the sewer pipe. During the connection process, the telescopic pipe is retractable, so it can adapt to the connection length, and the angle can be adjusted within a certain range, thereby improving the adaptability of the device. During use, the grid plate installed in the inner cavity of the transparent pipe can achieve filtering to prevent impurities from blocking the sewer pipe and making it difficult to clean. After blockage occurs, the setting of the transparent pipe makes it convenient to observe the blockage. The transparent pipe and the top connecting shell are detachable, and the transparent pipe and the telescopic pipe are detachable, so it is convenient to disassemble and clean the blockage, and each component of the device is detachably connected, so that it is convenient to carry out partial replacement when damage occurs, thereby reducing maintenance costs.

Preferably, both side walls of the inner cavity of the transparent pipe are fixed with clamping blocks; a bottom of the top connecting shell is integrally formed with a connecting pipe, and both side outer walls of the connecting pipe are provided with a clamping groove matched with the clamping block.

By adopting the above technical solution, the clamping block is first clamped into the clamping groove and then the top connecting shell is rotated, thereby achieving an effective limit connection so as to facilitate the disassembly operation.

Preferably, a top of the bottom connecting shell is integrally formed with a round pipe, an outer wall of the round pipe is fixed with a second external thread, and the second external thread is spirally connected to a tail end of the telescopic pipe.

By adopting the above technical solution, the bottom connecting shell and the telescopic pipe can be quickly disassembled and assembled.

Preferably, the inner cavity of the transparent pipe is integrally formed with a step, and the grid plate is placed on the step.

By adopting the above technical solution, the grid plate can be limited in position and can be disassembled at the same time, so that the grid plate can be easily disassembled and taken out for cleaning.

Preferably, both side walls of the top connecting shell are provided with connecting holes.

By adopting the above technical solution, the setting of the connecting hole makes it convenient for the top connecting shell to be connected to the water collecting component on the top of the house.

Preferably, one side of both end faces of the telescopic pipe is provided with a notch.

By adopting the above technical solution, the setting of the notch enables the first external thread and the second external thread to be accurately rotated into the inner cavity of the telescopic pipe.

Compared with the prior art, the invention has the following beneficial effects:

In the invention, a transparent pipe is provided between the top connecting shell and the telescopic pipe, and the transparent pipe is connected to the top connecting shell by a clamping block and a clamping groove. The tail end of the transparent pipe can be screwed with the telescopic pipe by a first external thread, so that the transparent pipe, the top connecting shell and the telescopic pipe can be disassembled conveniently and quickly. The grid plate can be used to filter impurities, so that the blockage is convenient to observe, and it is also convenient to disassemble for cleaning. In addition, the grid plate can be partially replaced when damaged, so as to reduce the subsequent maintenance cost. At the same time, the telescopic pipe can be extended and adjusted in angle, so that it can adapt to drainage arrangements of different angles and positions within a certain range, thereby improving the adaptability of the device.

The transparent pipe is screwed with the telescopic pipe by the first external thread, and the bottom connecting shell is screwed with the telescopic pipe by the second external thread, so that after the connection, the protrusions of the first external thread and the second external thread can be stuck in the folded recessed part of the telescopic pipe, thereby achieving a high degree of fit after the connection, and effectively avoiding overflow during the drainage process.

BRIEF DESCRIPTION OF THE DRAWINGS

Other features, objects and advantages of the invention will become more apparent from the detailed description of non-limiting embodiments made with reference to the following drawings.

Figure 1:
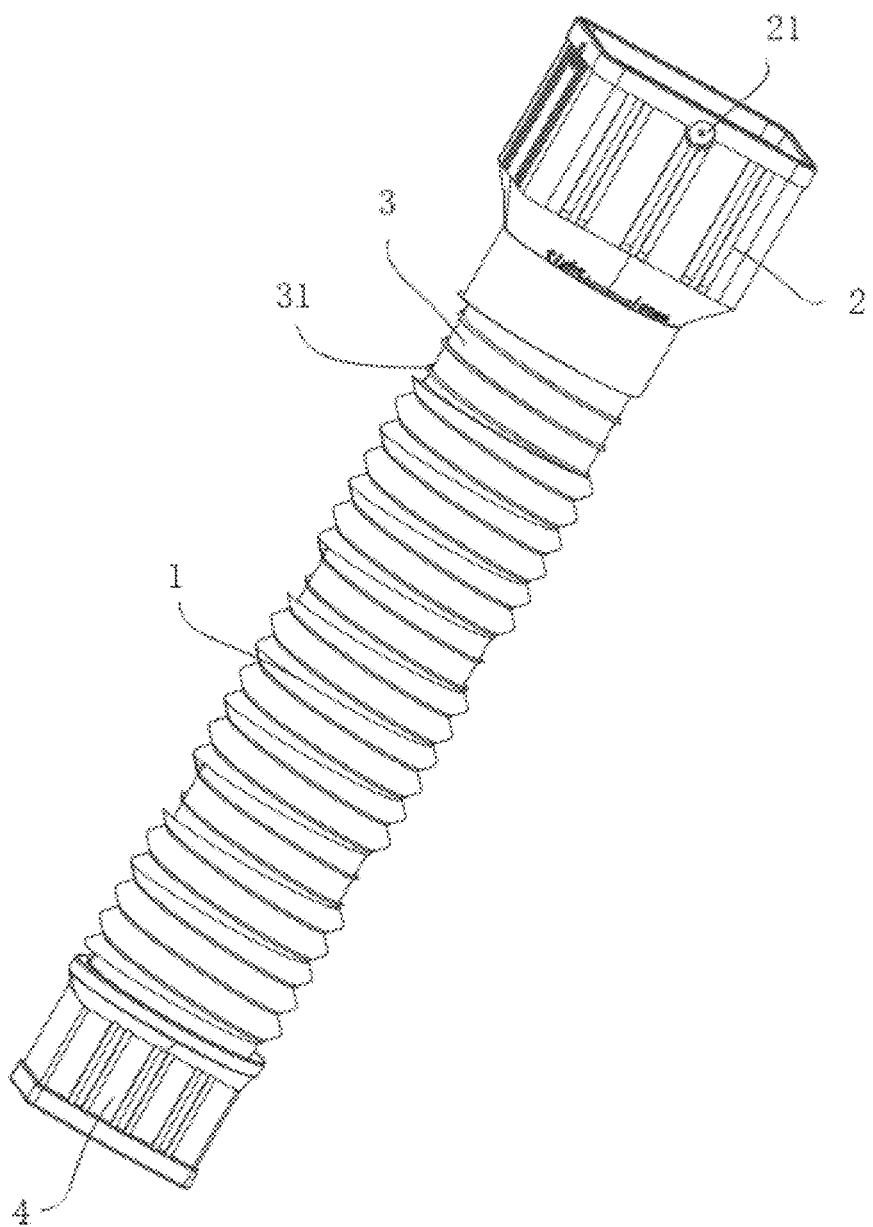
FIG. 1 is a schematic diagram of the overall structure of the easy-to-clean sewer pipe connecting pipe assembly according to the invention.

In the figures:
1 refers to the telescopic pipe;
2 refers to the top connecting shell; 21 refers to the connecting hole; 22 refers to the connecting pipe; 23 refers to the clamping groove;
3 refers to the transparent pipe; 31 refers to the first external thread; 32 refers to the clamping block; 33 refers to the grid plate;
4 refers to the bottom connecting shell; 41 refers to the round pipe.

SPECIFIC EMBODIMENT OF THE INVENTION

The technical solutions in the embodiments of the invention will be described clearly and completely hereinafter with reference to the drawings in the embodiments of the invention. Obviously, the described embodiments are part of the embodiments of the invention, rather than all of the embodiments.

In the description of the invention, it needs to be understood that the orientation or positional relationship indicated by the terms "center", "up", "down", "left", "right", "vertical", "horizontal", "inner", "outer", etc. are based on the orientation or positional relationship shown in the drawings, which are only for the convenience of describing the invention and simplifying the description, rather than indicating or implying that the device or element referred to must have a specific orientation, be constructed and operated in a specific orientation, and therefore cannot be understood as a limitation of the invention.

In the invention, unless otherwise clearly defined and limited, the terms "provided", "installed", "connected" and other terms should be interpreted broadly; for example, it can be a fixed connection, it can be a detachable connection, or integrated; it can be a mechanical connection or an electrical connection; it can be a direct connection, or an indirectly connection through an intermediate medium, and it can be an internal communication between two elements or the interaction relationship between two elements. For those of ordinary skill in the art, the specific meaning of the above terms in the invention can be understood according to specific circumstances.

With reference to FIGS. 1-4, the invention provides an easy-to-clean sewer pipe connecting pipe assembly, comprising a telescopic pipe 1, wherein one end of the telescopic pipe 1 is connected to a bottom connecting shell 4;
another end of the telescopic pipe 1 is connected to a transparent pipe 3, and an outer end of the transparent pipe 3 is detachably connected to a top connecting shell 2; an outer wall of the transparent pipe 3 is integrally formed with a first external thread 31, and a tail end of the transparent pipe 3 is spirally connected to the telescopic pipe 1 via the first external thread 31; an inner cavity of the transparent pipe 3 is installed with a grid plate 33.

In actual use, the top connecting shell 2 is first connected to the water collecting component on the top of the house, and then the bottom connecting shell 4 is connected to the sewer pipe. During the connection process, the telescopic pipe 1 is retractable, so it can adapt to the connection length, and the angle can be adjusted within a certain range, thereby improving the adaptability of the device. During use, the grid plate 33 installed in the inner cavity of the transparent pipe 3 can achieve filtering to prevent impurities from blocking the sewer pipe and making it difficult to clean. After blockage occurs, the setting of the transparent pipe 3 makes it convenient to observe the blockage. The transparent pipe 3 and the top connecting shell 2 are detachable, and the transparent pipe 3 and the telescopic pipe 1 are detachable, so it is convenient to disassemble and clean the blockage, and each component of the device is detachably connected, so that it is convenient to carry out partial replacement when damage occurs, thereby reducing maintenance costs.

Further, the inner cavity of the transparent pipe 3 is integrally formed with a step, and the grid plate 33 is placed on the step, so that the grid plate 33 can be limited in position and can be disassembled at the same time, so that the grid plate 33 can be easily disassembled and taken out for cleaning.

Further, both side walls of the top connecting shell 2 are provided with connecting holes 21; the setting of the connecting hole 21 makes it convenient for the top connecting shell 2 to be connected to the water collecting component on the top of the house.

Figure 2:
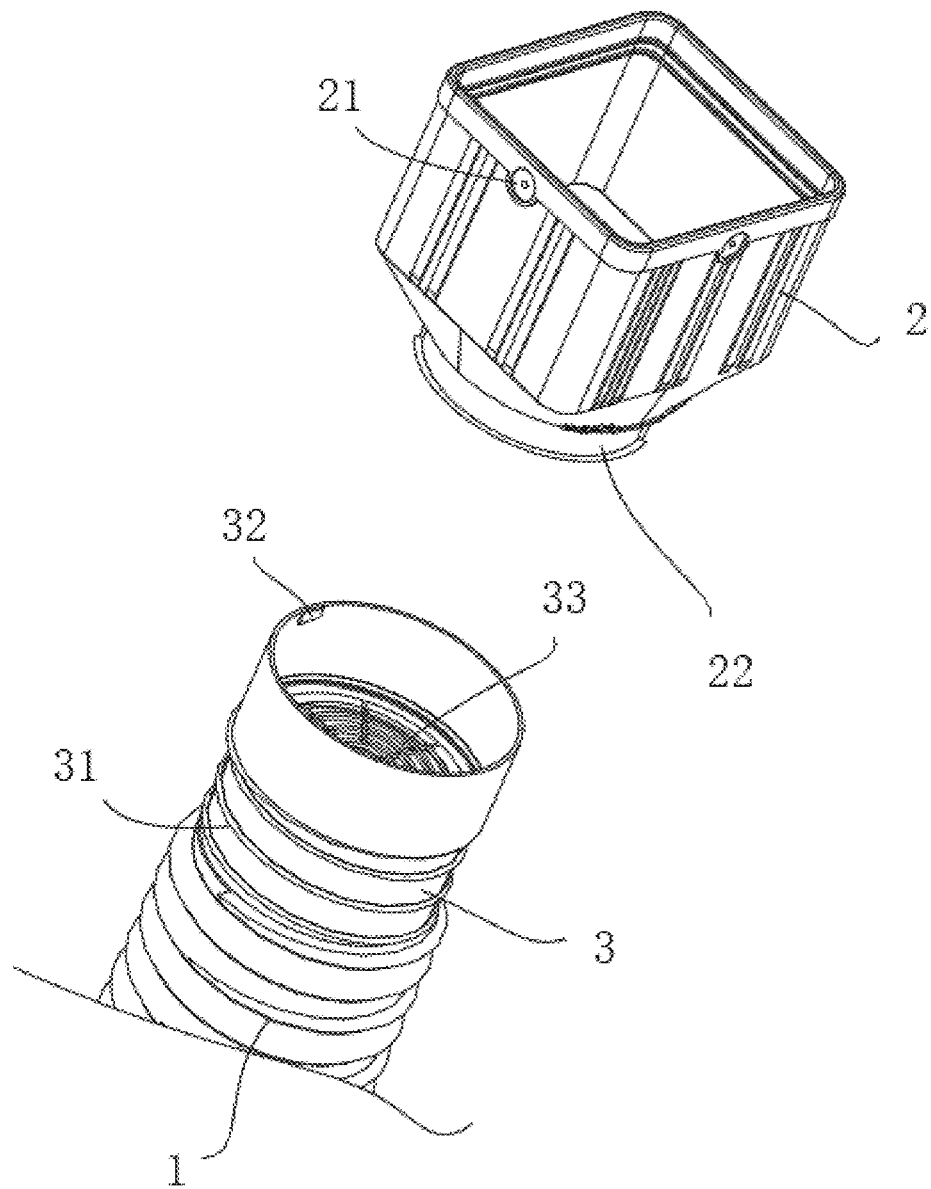
FIG. 2 is a schematic structural diagram showing the separation of the top connecting shell and the transparent pipe in the easy-to-clean sewer pipe connecting pipe assembly according to the invention.
Figure 3:
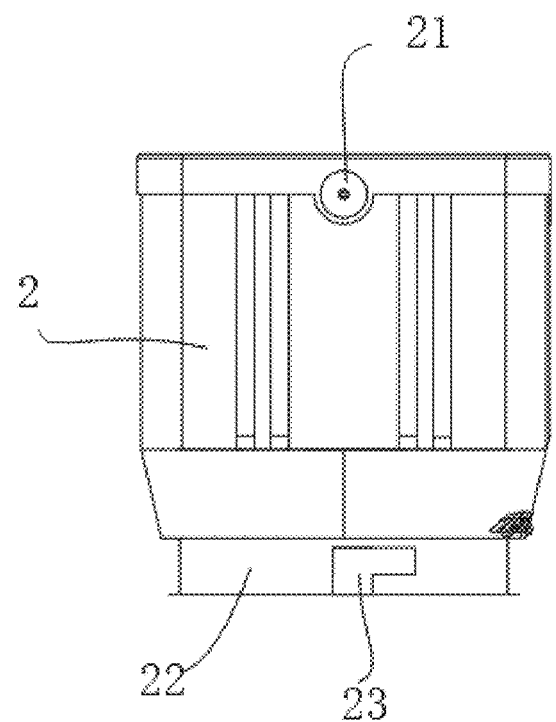
FIG. 3 is a schematic structural diagram of the top connecting shell in the easy-to-clean sewer pipe connecting pipe assembly according to the invention.

As shown in FIGS. 1, 2, and 3, both side walls of the inner cavity of the transparent pipe 3 are fixed with clamping blocks 32; a bottom of the top connecting shell 2 is integrally formed with a connecting pipe 22, and both side outer walls of the connecting pipe 22 are provided with a clamping groove 23 matched with the clamping block 32; the clamping block 32 is first clamped into the clamping groove 23 and then the top connecting shell 2 is rotated, thereby achieving an effective limit connection so as to facilitate the disassembly operation.

Figure 4:
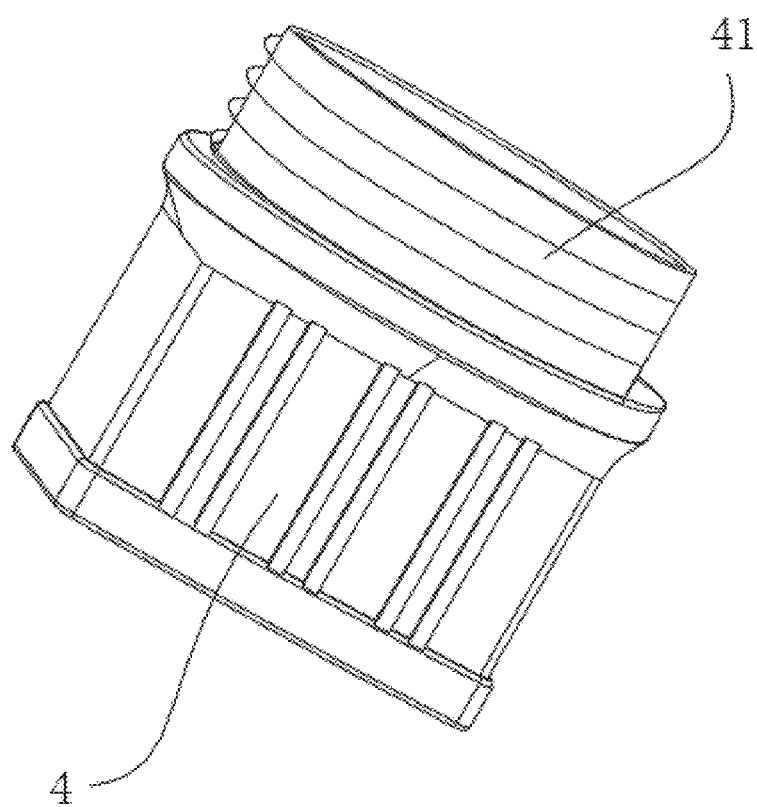
FIG. 4 is a schematic structural diagram of the bottom connecting shell in the easy-to-clean sewer pipe connecting pipe assembly according to the invention.

As shown in FIGS. 1 and 4, a top of the bottom connecting shell 4 is integrally formed with a round pipe 41, an outer wall of the round pipe 41 is fixed with a second external thread, and the second external thread is spirally connected to a tail end of the telescopic pipe 1, so that the bottom connecting shell 4 and the telescopic pipe 1 can be quickly disassembled and assembled.

It should be noted that one side of both end faces of the telescopic pipe 1 is provided with a notch; the setting of the notch enables the first external thread 31 and the second external thread to be accurately rotated into the inner cavity of the telescopic pipe 1.

The implementation principle of the easy-to-clean sewer pipe connecting pipe assembly according to the invention is:

in actual use, the top connecting shell 2 is first connected to the water collecting component on the top of the house, and then the bottom connecting shell 4 is connected to the sewer pipe. During the connection process, the telescopic pipe 1 is retractable, so it can adapt to the connection length, and the angle can be adjusted within a certain range, thereby improving the adaptability of the device. During use, the grid plate 33 installed in the inner cavity of the transparent pipe 3 can achieve filtering to prevent impurities from blocking the sewer pipe and making it difficult to clean. After blockage occurs, the setting of the transparent pipe 3 makes it convenient to observe the blockage. The transparent pipe 3 and the top connecting shell 2 are detachable, and the transparent pipe 3 and the telescopic pipe 1 are detachable, so it is convenient to disassemble and clean the blockage, and each component of the device is detachably connected, so that it is convenient to carry out partial replacement when damage occurs, thereby reducing maintenance costs.

In addition, the components in the easy-to-clean sewer pipe connecting pipe assembly according to the invention are all universal standard parts or components known to technical personnel in this field. The structure and principle can be known to technical personnel in this field through technical manuals or through conventional experimental methods. In the idle part of this device, all the above electrical components, which refer to power elements, electrical components, and compatible monitoring computers and power supplies, are connected through wires. The specific connection means should refer to the above working principle. The electrical connection is completed in the order of working. The detailed connection means are well-known technologies in this field. The above mainly introduces the working principles and processes, and no longer explains the electrical control.

The above shows and describes the basic principles and main features of the invention and the advantages of the invention. It is obvious to those skilled in the art that the invention is not limited to the details of the above exemplary embodiments, and the invention can be implemented in other specific forms without departing from the spirit or basic features of the invention. Therefore, no matter from which point of view, the embodiments should be regarded as exemplary and non-restrictive. The scope of the invention is defined by the attached claims rather than the above description, and it is intended that all changes falling within the meaning and scope of the equivalent elements of the claims are included in the invention. Any figure mark in the claims should not be regarded as limiting the claims involved.

The invention and the embodiments thereof are described hereinabove, and this description is not restrictive. What is shown in the drawings is only one of the embodiments of the invention, and the actual structure is not limited thereto. All in all, structural methods and embodiments similar to the technical solution without deviating from the purpose of the invention made by those of ordinary skill in the art without creative design shall all fall within the protection scope of the invention.

The invention claimed is:

1. A sewer pipe connecting pipe assembly, comprising a telescopic pipe, wherein one end of the telescopic pipe is connected to a bottom connecting shell;
    another end of the telescopic pipe is connected to a transparent pipe, and an outer end of the transparent pipe is detachably connected to a top connecting shell; an outer wall of the transparent pipe is integrally formed with a first external thread, and a tail end of the transparent pipe is spirally connected to the telescopic pipe via the first external thread; an inner cavity of the transparent pipe is installed with a grid plate;
    the inner cavity of the transparent pipe is integrally formed with a step, and the grid plate is placed on the step.

2. The sewer pipe connecting pipe assembly of claim 1, wherein walls of the inner cavity of the transparent pipe are fixed with clamping blocks; a bottom of the top connecting shell is integrally formed with a connecting pipe, and outer walls of the connecting pipe are provided with a clamping groove and clamping block mate with each other.

3. The sewer pipe connecting pipe assembly of claim 1, wherein a top of the bottom connecting shell is integrally formed with a round pipe, an outer wall of the round pipe is fixed with a second external thread, and the second external thread is spirally connected to a tail end of the telescopic pipe.

4. The sewer pipe connecting pipe assembly of claim 1, wherein walls of the top connecting shell are provided with connecting holes.

5. The sewer pipe connecting pipe assembly of claim 1, wherein one side of both end faces of the telescopic pipe is provided with a notch.

* * * * *